(12) United States Patent
Wakade

(10) Patent No.: US 7,695,823 B2
(45) Date of Patent: Apr. 13, 2010

(54) SELECTIVELY REINFORCED POWDER METAL COMPONENTS

(75) Inventor: Shekhar G. Wakade, Grand Blanc, MI (US)

(73) Assignee: GM Global Technology Operations, Inc., Detroit, MI (US)

(*) Notice: Subject to any disclaimer, the term of this patent is extended or adjusted under 35 U.S.C. 154(b) by 804 days.

(21) Appl. No.: 11/250,212

(22) Filed: Oct. 14, 2005

(65) Prior Publication Data

US 2007/0087217 A1    Apr. 19, 2007

(51) Int. Cl.
*B22F 5/10* (2006.01)
*B32B 5/02* (2006.01)
*B32B 5/14* (2006.01)
*B32B 15/04* (2006.01)

(52) U.S. Cl. .................. 428/548; 428/551; 428/660; 428/661; 384/434

(58) Field of Classification Search .................. None
See application file for complete search history.

(56) References Cited

U.S. PATENT DOCUMENTS

| | | | |
|---|---|---|---|
| 1,453,962 A | 5/1923 | Westwell | |
| 3,915,699 A | 10/1975 | Umehara | |
| 4,209,209 A | 6/1980 | Stark | |
| 4,643,145 A * | 2/1987 | Bolton et al. ............ | 123/195 R |
| 4,854,746 A | 8/1989 | Baugh et al. | |
| 5,536,089 A | 7/1996 | Weber et al. | |
| 5,551,782 A * | 9/1996 | Arnhold et al. ............ | 384/294 |
| 5,902,943 A | 5/1999 | Schaffer et al. | |
| 6,055,884 A * | 5/2000 | Lantz et al. ............... | 74/579 E |
| 6,076,971 A * | 6/2000 | Warwick et al. ............ | 384/433 |
| 6,086,258 A | 7/2000 | Cadle et al. | |
| 6,164,250 A * | 12/2000 | Bailey et al. ............... | 123/46 R |
| 6,216,647 B1 * | 4/2001 | Bailey ....................... | 123/46 R |
| 6,422,755 B1 | 7/2002 | Cadle et al. | |
| 6,471,406 B1 | 10/2002 | Cadle et al. | |
| 6,626,576 B1 | 9/2003 | Cadle et al. | |
| 6,647,945 B2 | 11/2003 | Harima | |
| 6,666,582 B2 * | 12/2003 | Benini et al. ................ | 384/433 |
| 6,814,043 B2 | 11/2004 | Harima et al. | |
| 2002/0170161 A1 * | 11/2002 | Cadle et al. .................. | 29/505 |
| 2002/0191875 A1 * | 12/2002 | Benini et al. ................ | 384/433 |
| 2003/0066579 A1 * | 4/2003 | Bergsma ...................... | 148/549 |
| 2003/0118260 A1 | 6/2003 | Suzuki | |
| 2004/0240762 A1 * | 12/2004 | Cadle et al. ................. | 384/432 |

FOREIGN PATENT DOCUMENTS

| | | | |
|---|---|---|---|
| JP | 60-011714 | * | 1/1985 |
| JP | 61-023730 | * | 2/1986 |
| JP | 62278308 | | 12/1987 |
| JP | 2005-207268 | * | 8/2005 |

* cited by examiner

*Primary Examiner*—Jennifer McNeil
*Assistant Examiner*—Jason L Savage
(74) *Attorney, Agent, or Firm*—Fraser Clemens Martin & Miller LLC; J. Douglas Miller

(57) ABSTRACT

A reinforced powder metal component is disclosed, the powder metal component having reinforcing preforms disposed in selected locations to provide a local reinforcement for the powder metal component.

10 Claims, 1 Drawing Sheet

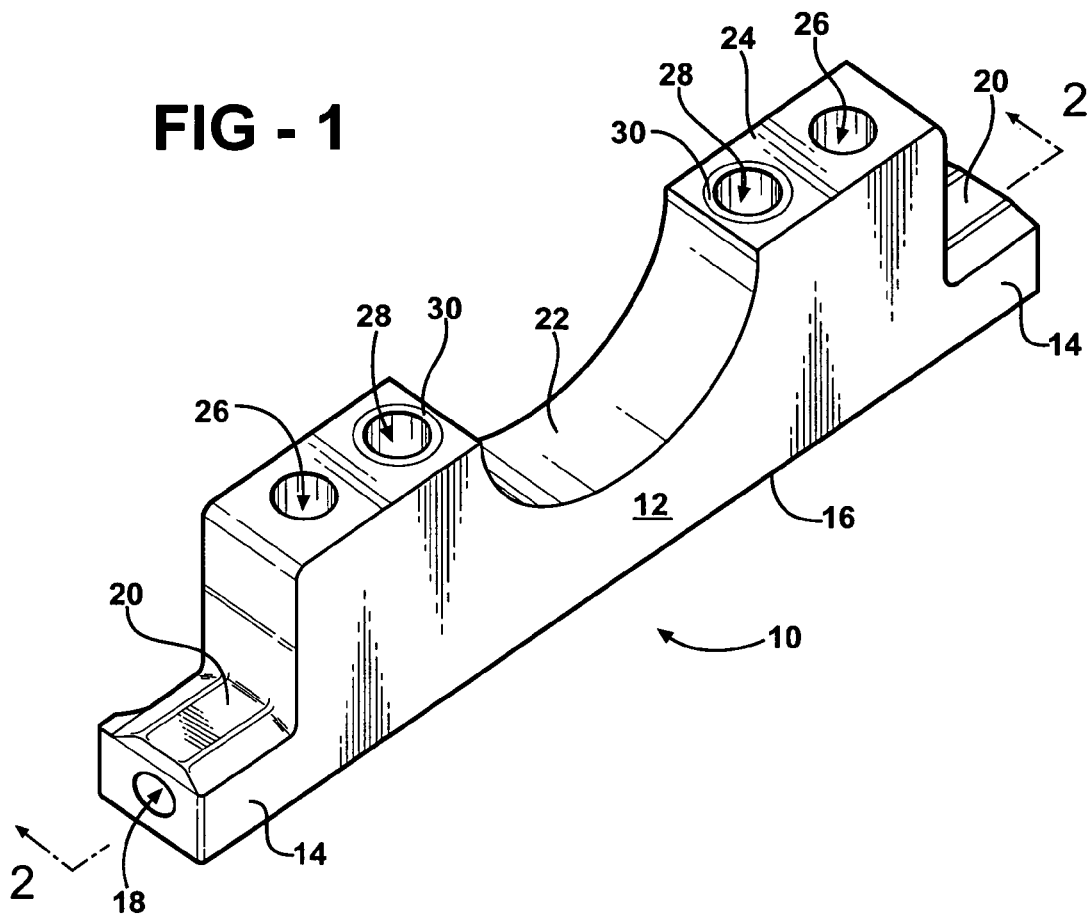
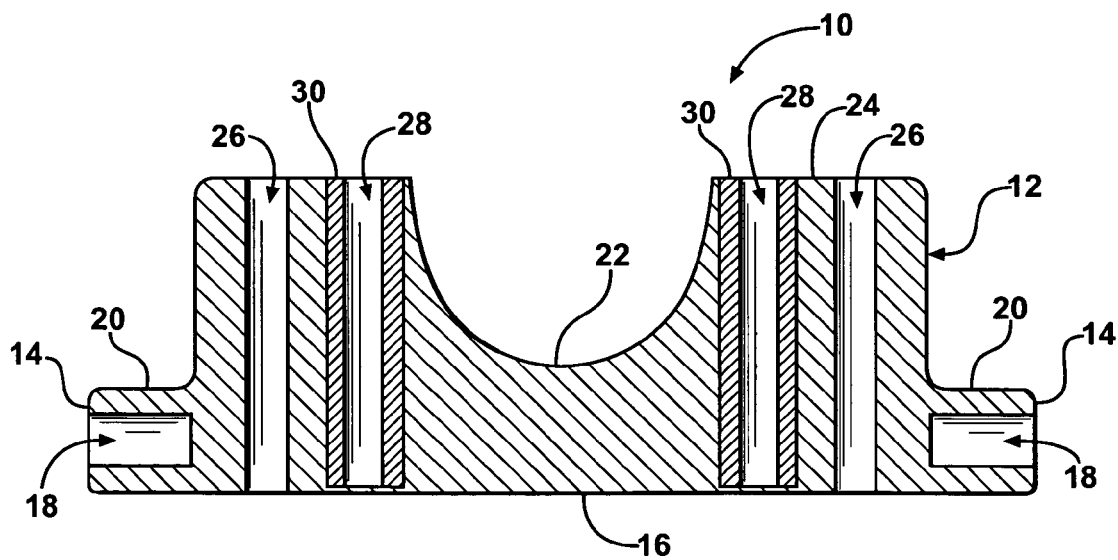

SELECTIVELY REINFORCED POWDER METAL COMPONENTS

FIELD OF THE INVENTION

The present invention relates to a reinforced powder metal component and more particularly to a reinforced powder metal component having reinforcing preforms disposed in selected locations to provide a local reinforcement for the powder metal component.

BACKGROUND OF THE INVENTION

Powder metal components such as crankshaft main bearing caps, for example, have been produced by using a powder metallurgical press and sinter operation. A density of a component produced using the powder metallurgical single press and sinter operation is typically in the range of about 6.4 to 7.0 gm/cc. The higher the density, the higher the mechanical properties observed in the component. However, the density reached in the component is a function of the number of processing steps involved, as well as a press tonnage available.

Generally, the density varies from position to position in the component. Usually the density is higher near surfaces. Therefore, a top flat surface as well as a bottom flat surface of a component will exhibit higher density values when compared to the density values at a mid-section.

Ever increasing higher engine horse power and torque requirements cause higher operational loads to be exerted on a crankshaft bearing cap. For this reason, lower density locations, positions, or regions in the bearing cap may become susceptible to an over-stressed condition, which may result in a reduction of fatigue life of the bearing cap. To avoid crack initiation and eventually its propagation, lower density locations, positions, or regions need to be strengthened. One option is to have a press capable of forming the component at the desired density. However, depending on the manufacturer, the press tonnage available, and the complexity of the component, that may not be always possible.

Since the mid-section of the bearing cap is lower in density and correspondingly higher in porosity, various methods have been investigated. Some of the methods include single needle programmable pattern peening of a bolted face peened area, over-burnishing of the bolt holes, and forming the threads rather than cutting the threads for side bolted end caps.

It would be desirable to produce a powdered metal component, wherein the component can be efficiently and accurately reinforced.

SUMMARY OF THE INVENTION

Consistent and consonant with the present invention, a powdered metal component, wherein the component can be efficiently and accurately reinforced, has surprisingly been discovered.

In one embodiment, the powder metal component comprises a powdered metal main body; and a reinforcing preform disposed in the main body in a desired position, the preform strengthening a region of the main body adjacent the preform.

In another embodiment, the powder metal component comprises a powdered metal main body, the main body having a shaft receiving recess formed in a side thereof and a pair of spaced apart apertures formed in the side, the apertures flanking the recess; and a reinforcing preform disposed in the main body in a desired position, the preform locally reinforcing the main body adjacent the preform.

The invention also provides methods of producing a powdered metal component.

In one embodiment, the method of producing the powdered metal component comprises the steps of providing at least one preform; providing a forming die having a forming cavity formed therein; providing a powdered metal forming press; disposing the preforms in the cavity of the forming die; providing a powdered metal; disposing the powdered metal in the cavity of the forming die adjacent the preform; and operating the forming press to form the powdered metal component.

DESCRIPTION OF THE DRAWINGS

The above, as well as other advantages of the present invention, will become readily apparent to those skilled in the art from the following detailed description of a preferred embodiment when considered in the light of the accompanying drawings in which:

FIG. 1 is a perspective view of a powdered metal main bearing cap according to an embodiment of the invention; and FIG. 2 is a sectional view of the main bearing cap illustrated in FIG. 1 taken along line 2-2.

DESCRIPTION OF THE PREFERRED EMBODIMENT

The following detailed description and appended drawings describe and illustrate various exemplary embodiments of the invention. The description and drawings serve to enable one skilled in the art to make and use the invention, and are not intended to limit the scope of the invention in any manner. In respect of the methods disclosed and illustrated, the steps presented are exemplary in nature, and thus, the order of the steps is not necessary or critical.

FIG. 1 illustrates a main bearing cap 10 according to an embodiment of the invention. The main bearing cap 10 is produced from powdered metal. Although the main bearing cap 10 is shown and described herein, it is intended to provide an exemplary embodiment of the invention. However, the invention is not limited to use with the main bearing cap 10 and can be used with any powder metal component or part, as desired.

The main bearing cap 10 includes a main body 12. A pair of spaced apart shoulders 14 extends outwardly from opposing sides of the main body 12 adjacent a first side 16 thereof. An aperture 18 is formed in each shoulder 14 and is adapted to receive a threaded fastener (not shown) or other suitable fastener therein. The apertures 18 facilitate fastening of the main bearing cap 10 to an engine cylinder block (not shown). Protuberances 20 are formed on the shoulders 14. The protuberances 20 facilitate a proper alignment and orientation of the main bearing cap 10 during an installation thereof.

A semi-cylindrical recess 22 is formed in a second side 24 of the main body 12 opposite the first side 16. The recess 22 is adapted to receive a shaft (not shown) therein such as a crankshaft, for example. Rotation of the shaft is facilitated by the recess 22. It is understood that a bearing or a bushing (not shown) can be disposed between the shaft and the recess 22.

A first pair of apertures 26 is formed in the second side 24 of the main body 12 on opposing sides and spaced from the recess 22. The first apertures 26 are adapted to receive threaded fasteners (not shown) or other suitable fasteners therein. The first apertures 26 facilitate fastening of the main bearing cap 10 to the engine cylinder block.

A second pair of apertures 28 is formed in the second side 24 of the main body 12. The second apertures 28 are disposed on opposing sides of the recess 22 between the first apertures 26 and the recess 22. Threaded fasteners (not shown) or other suitable fasteners are received in the second apertures 28 to facilitate fastening of the main bearing cap 10 to the engine cylinder block.

A reinforcing preform or insert 30 is disposed in each of the second apertures 28, as more clearly illustrated in FIG. 2. In the embodiment shown, the preform 30 is a hollow cylindrical structure. However, it is understood that other shapes and configurations can be used for the preforms 30 such as an annular array of longitudinal members or a helical member, for example. The shape of the preforms 30 may be uniquely designed to follow a contour of the component or part, or the preforms 30 may be planer or provided in sheets. In some instances, the preforms 30 may be applied in layers. It is also understood that a metal sponge having a defined geometry can be used. For the metal sponge, further machining may or may not be required. The preforms 30 may or may not have a higher density than the surrounding powdered metal material. However, in the case where the density is lower in the preforms, it may be necessary for the preforms 30 to have a higher stiffness. The size, shape, and location of the preforms 30 can be optimized using design analysis input, as well as experimentally.

The preforms 30 can be produced from any conventional material such as powdered metal materials having different material properties than the powdered metal forming the main bearing cap 10, steel, steel alloys, titanium alloys, ceramic based materials, materials reinforced with carbon fibers, materials reinforced with other reinforcing materials, and woven materials, for example. More specifically, the preforms 30 may be produced from a higher green density powdered metal alloy of the same or different chemical composition.

Alternatively, the preforms 30 can be produced from a material that is not a powdered metal and may have substantially different chemical composition and density that approaches that of cast or forged parts. The preforms 30 may be produced from a ceramic based material or other material having lower density than the powdered metal alloy, which may, however, have a higher stiffness.

Additionally, the preforms 30 may be produced from wire mesh of higher strength steels, a super alloy, or a titanium alloy. The preforms 30 can also be produced from materials having carbon or other reinforcing fibers with equal or unequal lengths depending upon the strength requirements of the component. The fibers may or may not be woven, as desired. If woven, the fibers may be woven in a multi-strand configuration or may be single strand.

If desired, the preforms 30 may include a coating on an outer surface thereof to further enhance the strength or other properties thereof, if desired. Similarly, a texture may be formed on the outer surface of the preforms 30 to enhance the strength or other properties of the preforms 30.

Although the preforms 30 are shown disposed in only the second apertures 28, it is understood that the preforms 30 could be used in other locations, positions, or regions of the main bearing cap 10 requiring reinforcement or strengthening such as the first apertures 26, the apertures 18 formed in the shoulders 14, and beneath the surface adjacent the recess 22, for example. Typically, it is desirable to locate the preforms 30 to not be exposed to facilitate a machining, although some portions of the preforms 30 may be exposed. Additionally, the preforms 30 can be disposed in regions of the main bearing cap 10, or other powdered metal part or component, where a localized density is lower than desired to provide strengthening or reinforcement of the main bearing cap 10, part, or component.

A method of producing a powdered metal component will now be described. For exemplary purposes, the method will be described for producing the main bearing cap 10, although the method can be used to produce other powdered metal components. Thus, the method is not limited to the main bearing cap 10.

Regions having material properties outside of a desired range or having localized lower density than a base powdered metal matrix can be improved using the preforms 30. Materials can be selected for the preforms 30 which maximize the strength or other properties of the affected location, position, or region. The preforms 30 are disposed in a cavity of a forming die of a powdered metal forming press at the location of the second apertures 28, or other location as desired where reinforcement is desired. A powdered metal having a desired composition is then disposed in the remainder of the cavity of the die around the preforms 30, followed by the pressing operation.

In order to militate against accidental breakage of the preforms 30, a force exerted by the forming press during the pressing operation may require modification over a typical forming process. Additionally, a modification of a powdered metal composition, including additives, may be required. The reinforced main bearing cap 10 or other component can then be sintered and further processed or machined as desired.

From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. A main bearing cap comprising:
    a powdered metal main body having a first side and a second side, said main body having a pair of spaced apart shoulders each extending outwardly and in opposite directions from opposing ends of the main body adjacent the first side thereof, said main body having a shaft receiving recess formed in the second side thereof, said main body having a pair of spaced apart first apertures formed in the second side and a pair of spaced apart second apertures formed in the second side, the second apertures flanking the recess and each of the second apertures disposed between one of the first apertures and the recess; and
    a reinforcing preform disposed in at least one of the second apertures and configured to receive a fastener for fastening the main body to the engine cylinder block, said preform locally strengthening an interior region of said main body adjacent said preform, wherein said preform includes at least one of a strength-enhancing coating disposed on an outer surface thereof and a strength-enhancing texture formed on an outer surface thereof, the outer surface of the preform being an exposed surface of the preform between the first side of said main body and the second side of said main body.

2. The main bearing cap according to claim 1, wherein a powdered metal of said preform has a greater stiffness than the powdered metal of said main body.

3. The main bearing cap according to claim 1, wherein said preform is formed from at least one of steel, a steel alloy, a titanium alloy, a ceramic material, and a fiber reinforced material.

4. The main bearing cap according to claim 3, wherein the fiber is at least one of a carbon fiber and a wire mesh.

5. The main bearing cap according to claim 1, wherein the main body further includes at least one protuberance formed on the shoulders to facilitate a proper alignment and orientation of the main body with the engine cylinder block during an installation thereof.

6. The main bearing cap according to claim 1, wherein the main body further includes shoulder apertures formed in an end of each shoulder and adapted to receive a fastener for fastening the main body to the engine cylinder block.

7. The main bearing cap according to claim 1, wherein the preform is a hollow cylindrical structure.

8. The main bearing cap according to claim 1, wherein the preform is formed from one of an annular array of longitudinal members and a helical member.

9. The main bearing cap according to claim 1, wherein the preform is formed from a plurality of layers disposed in the second apertures and following the contour thereof.

10. The main bearing cap according to claim 1, wherein the preform is a metal sponge.

* * * * *